Oct. 8, 1957    H. A. DORMAN ET AL    2,808,893
SUPERCHARGERS FOR ENGINES OF AUTOMOTIVE VEHICLES
Filed June 24, 1953    2 Sheets-Sheet 1
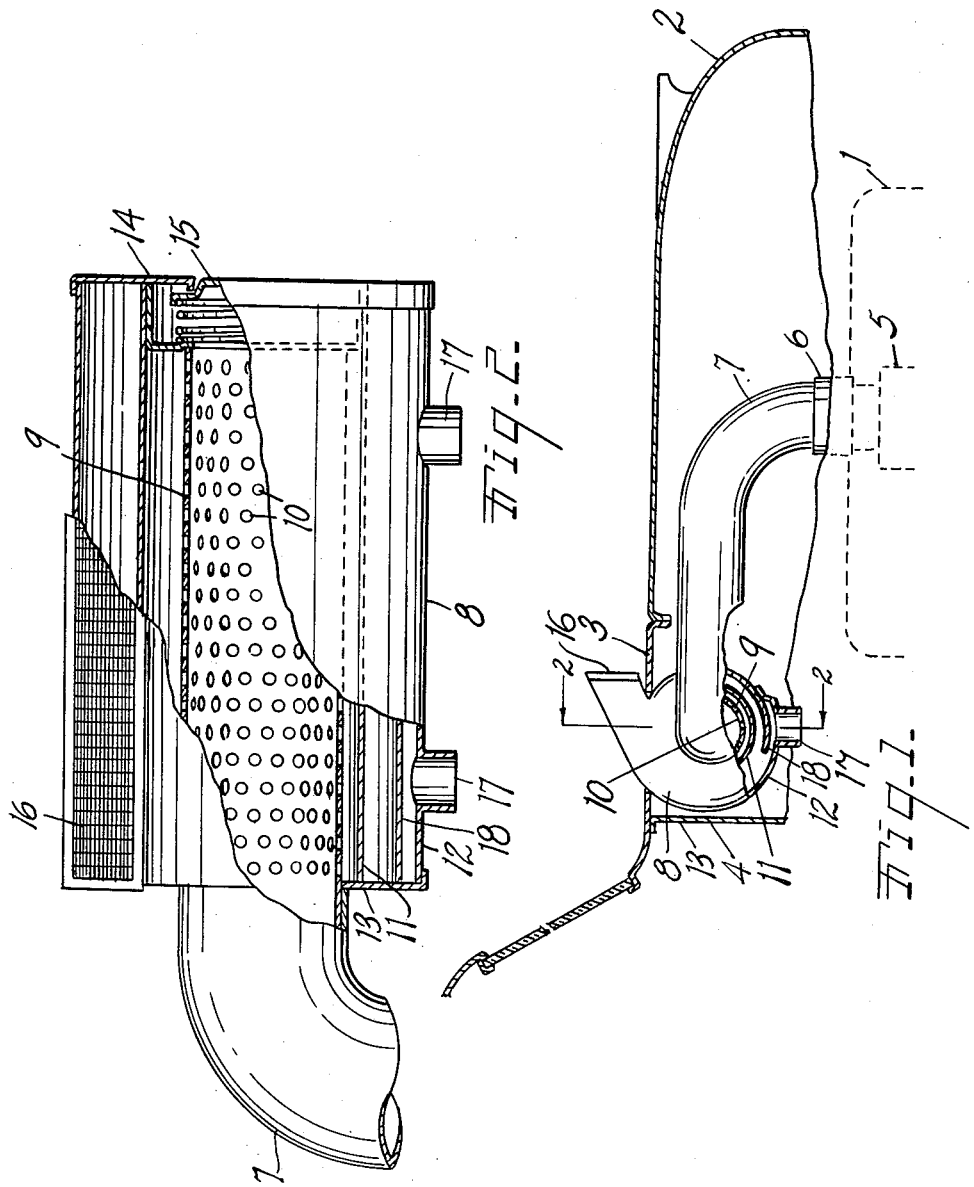
INVENTOR.
Harley A. Dorman
Douglas P. Dorman
BY 
ATTORNEY.

Oct. 8, 1957  H. A. DORMAN ET AL  2,808,893
SUPERCHARGERS FOR ENGINES OF AUTOMOTIVE VEHICLES
Filed June 24, 1953  2 Sheets-Sheet 2
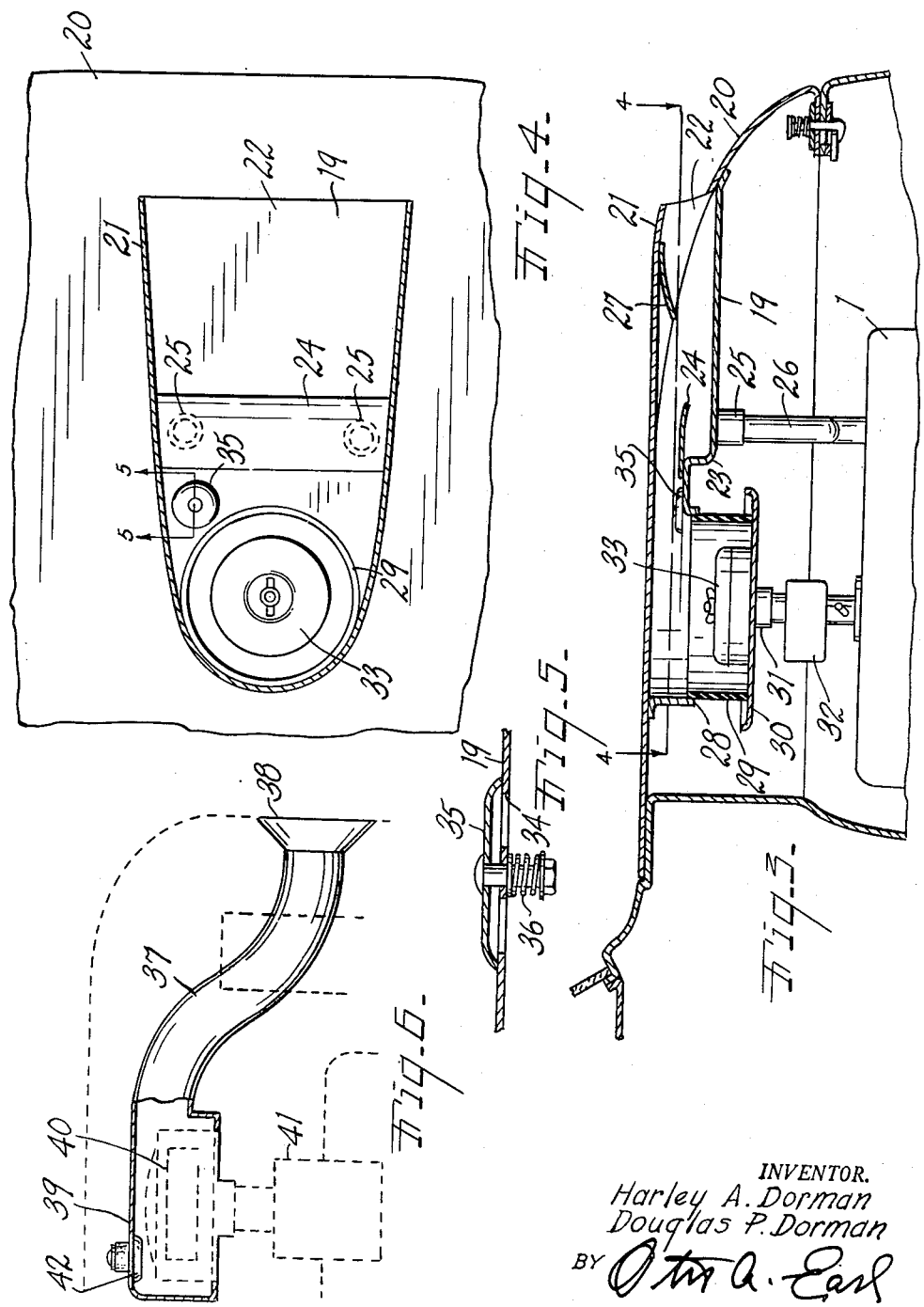
INVENTOR.
Harley A. Dorman
Douglas P. Dorman
BY
ATTORNEY.

United States Patent Office 2,808,893
Patented Oct. 8, 1957

2,808,893
SUPERCHARGERS FOR ENGINES OF AUTOMOTIVE VEHICLES

Harley A. Dorman, Detroit, Mich., and Douglas P. Dorman, Los Angeles, Calif.

Application June 24, 1953, Serial No. 363,868

2 Claims. (Cl. 180—54)

This invention relates to improvements in superchargers for engines of automotive vehicles.

The invention relates to a slipstream supercharger system for the internal combustion engine of automotive vehicles by means of which the impact pressure of the air against forwardly facing portions of the vehicle is utilized to obtain an increased volume of air charge in the engine of the vehicle. The invention described and claimed herein is a continuation in part of the invention described and claimed in our Patent No. 2,670,055 dated February 23, 1954, and entitled "Supercharging Air Induction Filter Device for Automotive Engines."

The principal objects of this invention are:

First, to provide a slipstream supercharger for the engines of automobiles and the like which will increase the operating efficiency of the engine as the forward motion of the automobile increases.

Second, to provide a slipstream supercharger for automotive engines which is quiet in operation.

Third, to provide a slipstream supercharger for automotive engines which functions to automatically remove and automatically discharge dust, water and foreign particles from the air supplied to the engine.

Fourth, to provide a slipstream supercharger which can be applied either as an accessory on existing automobile engines or as new equipment for new automobiles.

Fifth, to provide a slipstream supercharger which is little affected or liable to become clogged by snow, ice, bugs, leaves, etc., collecting at the intake.

Sixth, to provide a relatively inexpensive air induction system without moving parts that is effective to supercharge the engine of an automotive vehicle, that is, one that will cause the engine to receive a greater volume of air than it would without the system and thus to create the benefits of a supercharged engine, accomplishing this without obstructing or interfering with the artistic design of the exterior panels of the vehicle.

Other objects and advantages of our invention will be apparent from a consideration of the following description and claims.

The drawings, of which there are two sheets, illustrate three highly practical applications of the invention.

Fig. 1 is a fragmentary longitudinal cross sectional view through the engine compartment of an automotive vehicle illustrating a first form of the slipstream supercharger device operatively associated with the engine of the vehicle.

Fig. 2 is a front elevational view of the slipstream supercharging device shown in Fig. 1 partially broken away in cross section along the plane of line 2—2 in Fig. 1.

Fig. 3 is a fragmentary longitudinal cross sectional view through the engine compartment of an automotive vehicle and illustrating a second form of the air slipstream supercharger device operatively associated with the engine of the vehicle.

Fig. 4 is a fragmentary horizontal cross sectional view through the device shown in Fig. 3 taken along the plane of line 4—4 in Fig. 3.

Fig. 5 is a fragmentary cross sectional view through a relief valve illustrated in Figs. 3 and 4 taken along the plane of line 5—5 of Fig. 4.

Fig. 6 is a side elevational view partially broken away in section of a third form of the slipstream supercharger system, portions of the vehicle engine compartment and engine with which the system is associated being indicated by dotted lines.

All forms of the slipstream supercharger system incorporate an air induction conduit which opens continuously between the inlet to the engine and an inlet mouth disposed in and in facing relationship to the slipstream of the vehicle in which the system is installed. By the slipstream of the vehicle is meant the flow of air past or within the vehicle which is induced by movement of the vehicle in its normal forward motion. The slipstream thus created increases with increased speed of the vehicle and is available as a source of impact pressure for creating increased air pressure or increased air volume in the system.

We are aware that it has previously been proposed to collect the air for operation of an automobile engine from a point behind or otherwise affected by the air stream of the fan of the engine and conduct this air through a conduit to the carburetor of the engine in an attempt to provide a positive pressure supply of air to the carburetor. These previous proposals are effective to a limited degree only because the fan of an automobile engine becomes inefficient and, in fact, inoperative to produce an increased air pressure above certain moderate operating speeds of the automobile.

We are also aware that it has previously been proposed to utilize air under impact pressure resulting from the forward motion of the automobile for the purpose of controlling the temperature of the air to be supplied to the engine. These previous proposals are not found on automobiles made and sold today, but, instead, a thermostatically controlled choke which governs the fuel supply in place of the temperature of the air supply.

We have found that it is possible by suitably designing and selecting the area and location of the air duct and entrance to effect pressure in the duct due to the impact pressure resulting from the forward motion of the automobile and that when it is utilized it will increase the air pumping capacity of the engine and thus increase the power output.

We have found that the element of slipstream pressure alone does not make a successful slipstream supercharger. Each form of the invention further includes structure for separating out rain and large foreign particles from the air entering the induction conduct. By these means the slipstream supercharger system is rendered operative in all types of weather and driving conditions. All forms of the invention further include a relief valve by means of which air may be taken into the engine in the event the forwardly facing inlet mouth is clogged by snow, ice or other foreign matter.

As illustrated in Fig. 1, the engine 1 of an automotive vehicle is enclosed in an engine compartment defined in part by the hood panel 2, cowl panel 3 and dash panel 4. The engine is provided with the familiar type of downdraft carburetor 5 having an inlet throat 6. The supercharging system cooperating with this structure includes an air induction pipe 7 communicating between the inlet throat 6 and an air cleaning device 8. The cleaning device 8 includes an interior tubular body 9 having a plurality of holes 10 opening radially through its walls. The end of the induction pipe 7 communicates directly with one end of the body 9 to receive air therefrom.

Mounted around the inner tubular body 9 is a casing consisting of an inner wall 11 and an outer wall 12 wrapped spirally around the inner body 9 in spaced inwardly converging relationship. An end wall 13 closes one end of the casing while an end wall 14 closes the other end of the casing. A spring biased inwardly opening relief valve 15 is seated in the end wall 14 coaxially with the tubular body 9 and is adapted to open inwardly to admit air into the body 9 in the event that the casing and its inlet becomes clogged. The spiral passage opens at its inner end around the periphery of the tubular body 9. At its outer end the passage as formed by the walls 11 and 12 projects upwardly through an opening in the cowl panel 3 and terminates in a forwardly facing inlet mouth 16 that is thus positioned in forwardly facing relationship in the slipstream of the vehicle which passes over the top of the hood 2.

At the bottom of the casing within the engine compartment the outer panel 12 of the casing is provided with downwardly opening outlet tubes or slots 17 which open into the periphery of the spiral passage. A lip 18 is connected to the outer wall 12 and in forwardly facing relationship toward the incoming air in the passage. The lip 18 thus forms a dirt and moisture collecting strap or pocket completely along the periphery of the spiral passage through the casing.

In operation in the foregoing device, air will enter the forwardly facing inlet mouth 16 at increased pressure and will be forced to travel around the spiral passage in the casing. Rain or other foreign matter in the air stream will be thrown to the exterior thereof by centrifugal force and will be intercepted by the lip 18 and directed through the pocket and discharge tubes 17. Clean dry air will continue through the passage radially inwardly from the lip 18 to the tubular body 9 from which it will be advanced through the induction tube 7 to the carburetor 5.

The form of the supercharging system illustrated in Figs. 3, 4 and 5 includes an inner panel 19 secured in spaced relationship on the under side of the hood panel 20. The central portion of the hood panel is provided with an upwardly offset portion 21 to define a forwardly facing inlet mouth 22. The inner panel 19 is upwardly offset as at 23 and a divider or baffle 24 projects forwardly from the offset to define a forwardly facing pocket. The hood panel 20 and inner panel 19 coact to form an induction passage that is generally flat and communicates with the forwardly facing mouth 22 at the forward end of the hood.

The discharge tubes 25 open downwardly through the inner panel 19 from below the lip 24 and are adapted to register with the discharge pipes 26 mounted on the car body when the hood is closed as illustrated in Fig. 2. The lip 24 and inner panel 19 form a pocket for collecting rain and dirt in the air stream and for delivering the same to the discharge pipes 25 and 26. Near its forward end the passage through the induction system is provided with a front baffle 27 that directs air entering the inlet mouth in a downward direction so that rain and heavy matter therein is thrown into the pocket under the lip 24 while cleaner dry air proceeds over the lip to the rear end of the passage.

At its rear end the panel 19 is provided with a downwardly flanged circular opening 28 within which a cylinder 29 of rubber or other deflectable material is secured. The cylinder 29 seats on a panel or plate 30 mounted around the top of the inlet tube 31 of the carburetor 32. A conventional air cleaner 33 is provided on top of the plate 30. In any case, air passing through the cylinder 29 is directed at increased pressure to the inlet of the carburetor.

The rear portion of the panel 19 behind the lip 24 is provided with a by-pass opening 34 that is closed by the relief valve member 35. The valve member 35 is biased downwardly to closed position by the spring 36 acting on the stem of the valve member so that the valve member can open automatically by suction created in the induction passage in the event that the inlet mouth 22 becomes clogged with snow or debris. In the third form of the slipstream supercharger system a downwardly curved flexible or flexibly connected tube 37 extends forwardly from the cleaner housing 39 to a constantly open inlet mouth 38 that is positioned in forwardly facing relationship and opening to the slipstream of the vehicle or an area of impact pressure of the slipstream against a panel of the vehicle. At its rear end the tube 37 opens into the cleaner housing 39 that is positioned around in enclosing spaced relationship to the standard air cleaner 40 mounted on the carburetor 41 of the engine. The upwardly and inwardly curving shape of the tube 37 causes the air passing through the induction tube to travel in a curved path so that rain and dirt entering the inlet mouth are thrown against the rear or under wall of the tube 37. The rain and dirt collected along this lower wall flows downwardly by gravity through the inlet mouth 38 while clean dry air is directed along the upper portion of the tube 37 to the housing 39 and air cleaner 40. As in the other forms of the system, an emergency relief valve is provided at 42 to admit air to the carburetor in case the conduit 37 becomes clogged.

Having thus described our invention, what we claim to be new and desire to secure by Letters Patent is:

1. In combination with an automobile having a hood partially enclosing an engine compartment at the front of the automobile, said hood having an opening formed therein and facing forwardly of the automobile, an air induction duct on the underside of said hood with an inlet formed by said opening, a downwardly and rearwardly curved baffle in said duct near the forward end thereof positioned to deflect air entering said duct downwardly, a downwardly and forwardly directed baffle positioned in said duct rearwardly of said first baffle, means including said second baffle and duct forming a dirt and moisture collecting trap at the bottom of said duct, a dirt and moisture drain leading from said trap to the exterior of said duct, an engine having an air intake, an air cleaner mounted in said compartment having an air outlet in communication with said engine air intake and having an air intake, a wall of said duct having an outlet port formed therein adjacent said air cleaner, a relief valve opening into said duct from said compartment and yieldably biased to closed position, and means forming a releasable and yieldable sealed connection between said port and the air intake of said air cleaner whereby air entering said duct under the impact of forward motion of the automobile is directed under pressure to said air cleaner.

2. In combination with an automobile having a hood partially enclosing an engine compartment at the front of the automobile, said hood having an opening formed therein and facing forwardly of the automobile, an air induction duct on the underside of said hood with an inlet formed by said opening, a downwardly and rearwardly curved baffle in said duct near the forward end thereof positioned to deflect air entering said duct downwardly, means including a forwardly directed baffle positioned in said duct rearwardly of said first baffle and forming a dirt and moisture collecting trap with said duct below said first baffle, a dirt and moisture drain in said trap, an engine having an air intake, an air cleaner mounted in said compartment having an air outlet in communication with the air intake of said engine and having an air intake, a wall of said duct having an outlet port formed therein adjacent said air cleaner, and means forming a releasable and yieldable sealed connection between said port and the air intake of said air cleaner whereby air entering said duct under the impact of forward motion of the automobile is directed under pressure to said air cleaner.

References Cited in the file of this patent

UNITED STATES PATENTS

| | | |
|---|---|---|
| 2,150,295 | Somers | Mar. 14, 1939 |
| 2,196,332 | Baile | Apr. 9, 1940 |
| 2,197,503 | Martin | Apr. 16, 1940 |
| 2,203,407 | Donaldson | June 4, 1940 |
| 2,267,706 | Baile et al. | Dec. 30, 1941 |
| 2,299,157 | Lowther | Oct. 20, 1942 |
| 2,670,055 | Dorman et al. | Feb. 23, 1954 |
| 2,701,024 | Thomas | Feb. 1, 1955 |